April 12, 1955
J. J. WHITTAMORE
2,706,002
WORK CLAMPING MEMBERS HAVING CUTTERS
MOVABLE LONGITUDINALLY THEREOF
FOR CUTTING SHEET ROCK
Filed Dec. 22, 1950
2 Sheets-Sheet 1
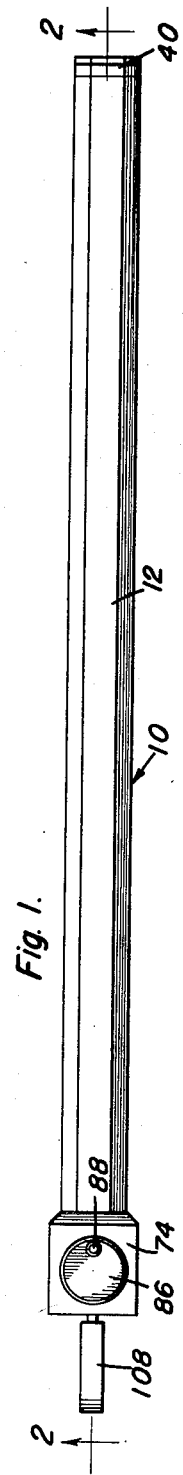
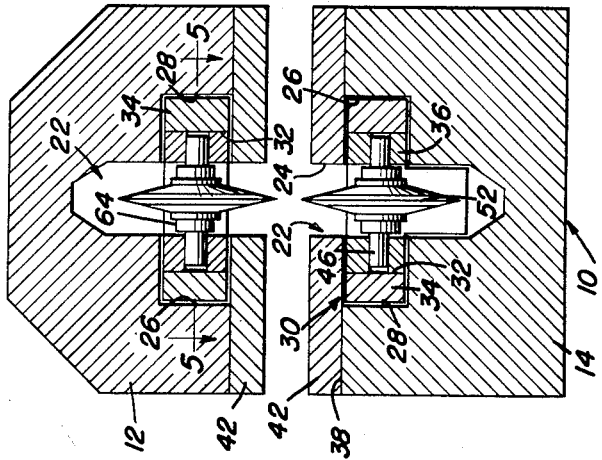
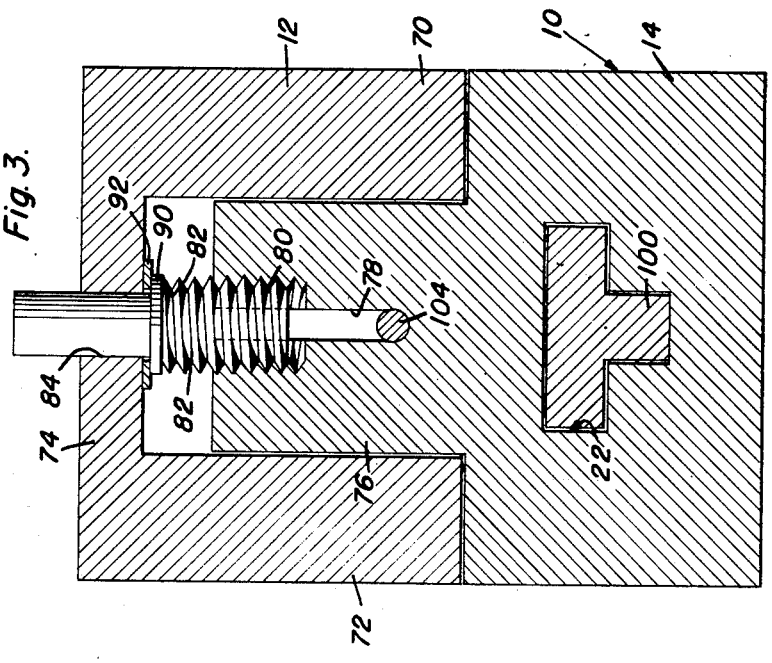
James J. Whittamore
INVENTOR.
BY
*Attorneys*

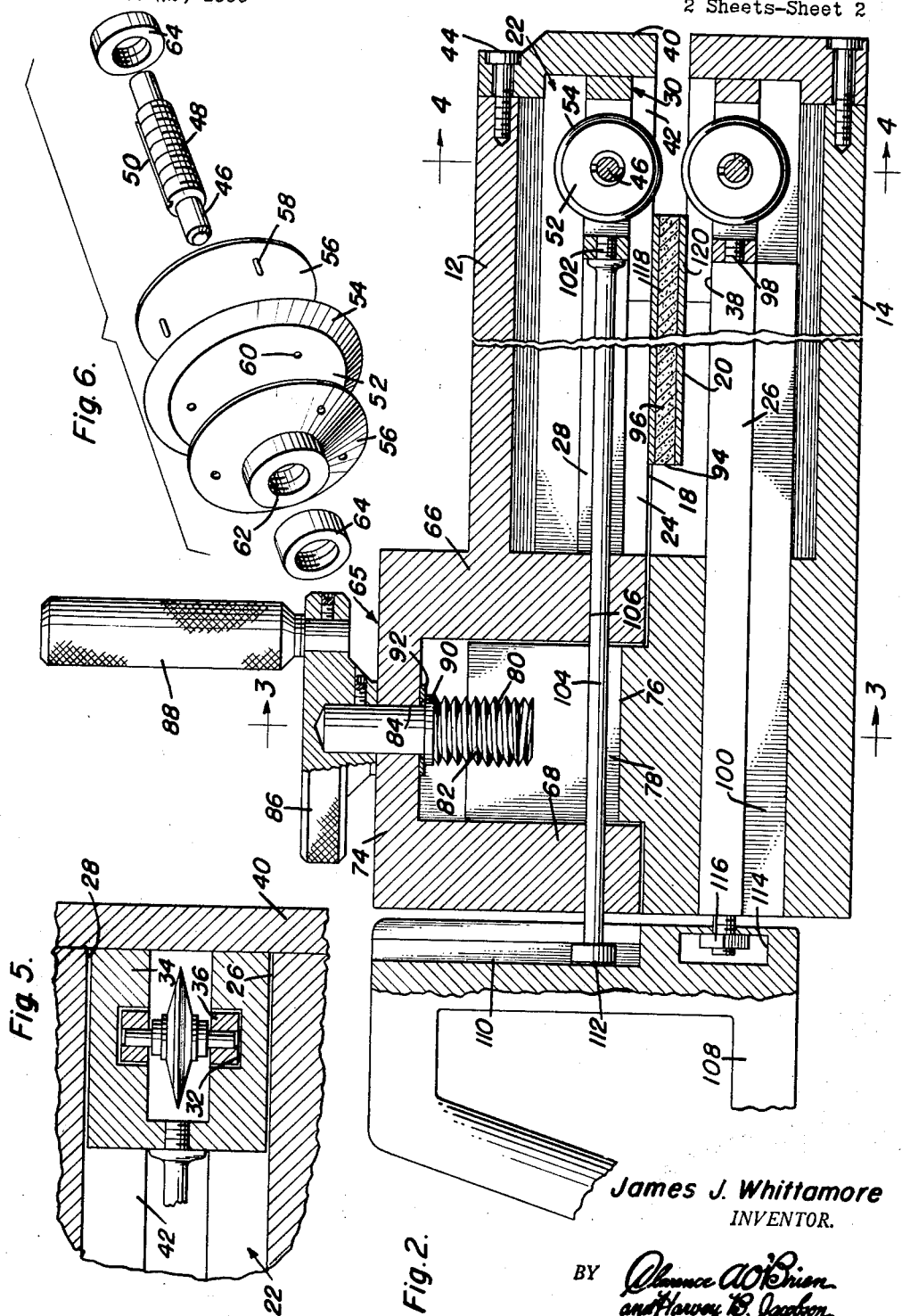

United States Patent Office 2,706,002
Patented Apr. 12, 1955

2,706,002

WORK CLAMPING MEMBERS HAVING CUTTERS MOVABLE LONGITUDINALLY THEREOF FOR CUTTING SHEET ROCK

James J. Whittamore, Kingsport, Tenn., assignor of fifty per cent to Daniel A. Garst, Jonesboro, Tenn.

Application December 22, 1950, Serial No. 202,262

8 Claims. (Cl. 164—77)

This invention comprises novel and useful improvements in cutters, and more particularly pertains to cutters for building material of the type known as Sheetrock wherein a matrix of plaster is interposed between two layers of pressed paper.

An important object of this invention is to provide a device which will readily score the opposite sides of the work piece, such as Sheetrock, so that the latter may be readily severed.

Another object of this invention is to provide a cutting device which may be readily clamped on a work piece and the cutters carried by the device then guidably moved along the device to score the opposite sides of the work piece therebetween.

A further object of this invention is to provide a cutting device which is adapted to cut sheets having different depths, which is of compact and simple construction, and which is well adapted for the purposes intended.

An important feature of this invention resides in the provision of a pair of elongated work clamping members with a cutter mounted on each member and movable longitudinally thereof, with a mechanism for adjustably moving the members towards and away from each other to clamp a work piece therebetween, together with a mechanism to move the cutters longitudinally of the members and score the work piece.

Another important feature of this invention resides in the provision of a cutting device, in accordance with the foregoing feature with a transverse socket carried by one member and a guide block carried by the other member to laterally guide the members relative to each other, the lateral adjusting mechanism being carried by the socket and guide block.

Another feature of this invention resides in the provision of a cutting device, in accordance with the foregoing feature, together with an improved mechanism for mounting the cutters for rotation about an axis transverse the direction of movement thereof.

These, together with various ancillary objects and features are attained by this device, a preferred embodiment of which has been illustrated in the accompanying drawings wherein:

Figure 1 is a top plan view of the cutting device;

Figure 2 is a fragmentary longitudinal sectional view, taken on the plane 2—2 of Figure 1;

Figure 3 is a transverse sectional view, taken on the plane 3—3 of Figure 2;

Figure 4 is a transverse sectional view, taken on the plane 4—4 of Figure 2;

Figure 5 is a fragmentary longitudinal sectional view, taken on the plane 5—5 of Figure 4; and Figure 6 is an exploded assembly view of the cutter unit.

Reference is now made more specifically to the accompanying drawings wherein the cutting device is indicated generally by the numeral 10.

The cutting device includes a first and a second elongated clamping member 12 and 14 respectively. Each of the clamping members 12 and 14 has a substantially flat work engaging face 18 and 20 respectively, and a longitudinally extending cruciform slot 22 therein, one leg 24 of which slot communicates with the work engaging face of the clamping member. Opposed legs 26 and 28 of the slot slidably receive the cutter mounting yoke 30, which yoke has transverse recesses 32 in the registering faces of the legs 34 thereof for the reception of the bearing blocks 36. It may be noted from a consideration of Figures 4 and 5 that the bearing blocks are slidable transversely of the legs 34 of the yoke 30, to permit insertion and removal of the cutter assembly, to be set forth more fully hereinafter, and the bearing blocks 34 are retained in position in the yoke by the side walls of the legs 26 and 28 of the cruciform slot 22.

In order to permit the ready insertion and removal of the cutter assembly and yoke, each of the clamping members 12 and 14 are transversely recessed as at 38, and a cap member 40 having depending laterally spaced face plates 42 thereon is secured to the members, as by fasteners 44. The face plates 42 are disposed in recess 38, and define a continuation of the leg 24 of the cruciform slot therebetween.

The cutter assembly includes a stub shaft 46, externally threaded as at 48, intermediate its ends, and keyed as at 50. A disk cutter 52, having a V-shaped periphery 54 is disposed on the shaft 46, locking collars 56 having spaced locking pins 58 thereon are disposed on opposite sides of the cutter disk, the pins being receivable in corresponding apertures 60 in the disk, to prevent relative rotation of the disk 52 and collars 56. The collars are keyed as at 62, whereby the collars will be non-rotatably received on the shaft 46, suitable lock nuts 64 being threaded onto the portion 48 of the shaft, to retain the disk and collars in position thereon.

In order to adjustably move the members 12 and 14 relative to each other, the member 12 has a socket 65 formed on one end thereof, which socket includes end walls 66 and 68, side walls 70 and 72, and a front wall 74. The socket 65 slidably and guidably receives a guide block 76 rigidly secured to and preferably integral with the clamping member 14. For reasons which will later become apparent as the following description proceeds the guide block 76 is provided with a slot 78 extending in perpendicular aligned relation to the clamping member 14. The block 76 is also provided with an internally threaded bore 80 for the reception of an adjusting screw 82 which extends through the bore 84 in the front wall 74. An actuating knob 86 is non-rotatably attached to the portion of the screw 82 which extends out of the wall 74, and a handle 88 is carried by the knob, to facilitate rotation thereof. As will be noted, the knob 86 engages one face of the wall 74, and the shouldered portion 90 of the adjusting screw engages the washer 92 and the other side of the wall 74, whereby the block 76 and the second work clamping member 14 will be positively urged towards and away from the first work clamping member 12 in response to rotation of the screw 82. A shoulder 94 is formed on one of the members, such as the second work clamping member 14, and spaced longitudinally thereon from the block 76, to support the work sheet 96 in such a manner as to permit complete scoring of the same. Obviously, the shoulder 94 extends perpendicular to the slot 22, so as to properly position the work sheet relative to the clamping members.

The cutter mount yoke 30, carried by the second clamping member 14 is threadedly attached, as at 98, to a T-shaped guide bar 100 which is slidably disposed in the cruciform slot 22. The yoke carried by the first clamping member is threadedly attached, as at 102, to an actuator rod 104 which extends through aligned bores 106 in the end walls 66 and 68 of the socket 65, and which rod is slidably disposed through the slot 78 in the block 76.

A handle member 108 has a T-slot 110 therein for slidably receiving the nut 112, which is threadedly attached to the end of the rod 104, remote from that to which the cutter assembly is attached, the handle also having a second relatively perpendicular T-slot 114 for the reception of the nut 116 attached to the end of the guide bar 100 remote from that to which the cutter assembly is attached.

In operation, a work piece 96 of sheet material such as Sheetrock, or the like, having a matrix of plaster 118 interposed between two layers of paper 120, is disposed between the work engaging faces 18 and 20 of the first and second work clamping members 12 and 14 respectively. The knob 86 is then rotated to actuate the screw 82 which positively urges the members 12 and 14 into engagement with the work piece 96. The handle 108 is then moved away from the members 12 and 14 which pulls the cutter disks 52, through the intermediary of the rod 104 and guide bar 100, longitudinally of the members to which they are attached thereby scoring the work piece on opposite sides thereof. Obviously, various depths of cut may be achieved through suitable design of the bearing blocks 36, or by varying the diameter of the cutting disks 32.

Having described the invention, what is claimed as new is:

1. A building material cutter comprising a pair of elongated work clamping members each having a work clamping face disposed in registry with each other, said members each having a slot extending longitudinally thereof opening into the work clamping face, a cutter longitudinally movably mounted in the slot in each of said members and extending outwardly beyond the work clamping face, means for moving said cutters in said slots longitudinally of said members to cut the work piece therebetween, and means for adjustably moving the registering faces in parallel motion towards and away from each other.

2. A building material cutter comprising a first and a second elongated clamping member, said first and second members each having a work engaging face, said first member having a socket extending transversely thereof, said second member having a transversely extending guide block thereon slidably received in said socket, means carried by said first member and engaging said guide block to adjustably move said members relative to each other, a cutter carried by each of said members and movable longitudinally thereof, said cutter having a cutting edge extending outwardly beyond the work clamping face to cut a work piece disposed between the work engaging faces of said members, and means for simultaneously moving said cutters longitudinally of said members.

3. The combination of claim 2 wherein said block has a slot therein, said means for moving said cutters including a rod extending transversely through said socket and having one end thereof secured to the cutter carried by said first member, said rod extending through said slot in said block.

4. The combination of claim 3 wherein said first member has a track extending longitudinally thereof, the cutter on said first member being slidably disposed in said track.

5. A building material cutter comprising a first and a second elongated work clamping member, said members each having a flat work engaging face, said members having a longitudinally extending guideway formed therein and opening into the work engaging face thereof, a rotary cutter longitudinally slidably disposed in each of said guideways and extending outwardly of said work engaging face, means laterally adjustably connecting said members to each other, an actuator operatively connected to each of said cutters and extending longitudinally of said members, and an operating handle attached to the end of said actuators remote from that to which the cutters are attached for selectively moving said cutters.

6. A plasterboard cutter comprising a first and a second elongted clamping member, said first and second members each including a sheet engaging face, said sheet engaging faces being in registry with each other, each of said clamping members having a longitudinally extending cruciform slot therein, one leg of each of said slots communicating with the work engaging face of the respective clamping members, a yoke slidably mounted in each of said slots, a rotary cutter mounted in each of said yokes, said rotary cutters extending beyond the respective work engaging faces, means for moving the clamping members in parallel relation towards and away from each other, means for simultaneously reciprocating said yokes in said slots.

7. A plasterboard cutter comprising a first and a second elongated clamping member, said first and second members each including a sheet engaging face, said sheet engaging faces being in registry with each other, each of said clamping members having a longitudinally extending cruciform slot therein, one leg of each of said slots communicating with the work engaging face of the respective clamping members, a yoke slidably mounted in each of said slots, a rotary cutter mounted in each of said yokes, said rotary cutters extending beyond the respective work engaging faces, a transversely extending guide block rigidly fixed to the end of one of said clamping members, a socket rigidly fixed on the end of the other clamping member, said socket slidably engaging said guide block, means for adjusting said socket along said guide block, means for simultaneously traversing said yokes along said cruciform slots.

8. A plasterboard cutter comprising a first and a second elongated clamping member, said first and second members each including a sheet engaging face, said sheet engaging faces being in registry with each other, each of said clamping members having a longitudinally extending cruciform slot therein, one leg of each of said slots communicating with the work engaging face of the respective clamping members, a yoke slidably mounted in each of said slots, a rotary cutter mounted in each of said yokes, said rotary cutters extending beyond the respective work engaging faces, a transversely extending guide block rigidly fixed to the end of one of said clamping members, a socket rigidly fixed on the end of the other clamping member, said socket slidably engaging said guide block, means for adjusting said socket along said guide block, a T-shaped actuating bar attached to the yoke in the clamping member fixed to the guide block, a T-shaped passage in said guide block communicating with said cruciform slot, said T-shaped actuating bar being slidably received in said passage and said cruciform slot, a handle fixed on said T-shaped actuating bar, an actuating rod attached to the yoke in the clamping member fixed to said socket, guide apertures in said socket, said actuating rod being slidably mounted in said guide apertures, a T-slot in said handle, a head on said actuating rod, said head being received in said T-slot.

References Cited in the file of this patent

UNITED STATES PATENTS

| | | |
|---|---|---|
| 564,026 | Palmer | July 14, 1896 |
| 931,220 | Roesch et al. | Aug. 17, 1909 |
| 1,424,050 | Thomas et al. | July 25, 1922 |
| 1,434,475 | Austin | Nov. 7, 1922 |
| 1,455,501 | McGee | May 15, 1923 |
| 1,583,188 | Schumacher | May 4, 1926 |
| 2,222,528 | Chilton | Nov. 19, 1940 |

FOREIGN PATENTS

| | | |
|---|---|---|
| 35,708 | Germany | Oct. 1, 1885 |
| 275,997 | Germany | July 1, 1914 |